US008326325B2

(12) United States Patent
Ge

(10) Patent No.: US 8,326,325 B2
(45) Date of Patent: Dec. 4, 2012

(54) METHOD AND DEVICE FOR SYNCHRONIZING LOCATION TRIGGER INFORMATION

(75) Inventor: Zhengkai Ge, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 723 days.

(21) Appl. No.: 12/420,953

(22) Filed: Apr. 9, 2009

(65) Prior Publication Data

US 2009/0191896 A1 Jul. 30, 2009

Related U.S. Application Data

(63) Continuation of application No. PCT/CN2007/070913, filed on Oct. 17, 2007.

(30) Foreign Application Priority Data

Jan. 18, 2007 (CN) .......................... 2007 1 0072887

(51) Int. Cl.
H04W 24/00 (2009.01)
(52) U.S. Cl. .................................. 455/456.2; 455/456.1
(58) Field of Classification Search .................. 455/418, 455/456.1, 456.2, 456.3
See application file for complete search history.

(56) References Cited

U.S. PATENT DOCUMENTS

| 7,937,092 | B2 * | 5/2011 | Shim .......................... 455/456.1 |
| 2004/0054628 | A1 | 3/2004 | De Jong et al. | |
| 2006/0014531 | A1 * | 1/2006 | Nam et al. ..................... 455/418 |
| 2006/0258371 | A1 | 11/2006 | Krishnamurthi et al. | |
| 2006/0293066 | A1 | 12/2006 | Edge et al. | |
| 2010/0062752 | A1 * | 3/2010 | Shim ........................... 455/418 |
| 2010/0267398 | A1 * | 10/2010 | Kim et al. .................. 455/456.3 |

FOREIGN PATENT DOCUMENTS

| CN | 1798428 A | 7/2006 |
| CN | 101227710 B | 4/2012 |
| EP | 1 672 935 | 6/2006 |
| KR | 10-2006-0004168 | 1/2006 |
| TW | 476910 | 2/2002 |

OTHER PUBLICATIONS

International Search Report from P.R. China in International Application No. PCT/CN2007/070913 mailed Feb. 14, 2008.
English language abstract of TW 476910 published Feb. 21, 2002.
English Translation of Written Opinion of the International Searching Authority for PCT Application No. PCT/CN2007/070913, mailed Feb. 14, 2008, 3 pgs.
EPO Communication attaching an Extended European Search Report for Application No. EP 07 81 7104, dated Jan. 18, 2010, 6 pgs.

* cited by examiner

Primary Examiner — Patrick Edouard
Assistant Examiner — Myron K Wyche
(74) Attorney, Agent, or Firm — Conley Rose, P.C.; Grant Rodolph

(57) ABSTRACT

A method for synchronizing location trigger information, a location device, and a Secure User-Plane Location (SUPL)-Enabled Terminal (SET) includes: receiving a request for synchronizing location trigger information from a location User Equipment (UE), where the request carries the user identifier information of the user; from the correspondingly stored user identifier information and location trigger information, obtaining the location trigger information corresponding to the user identifier information of the location user; and generating a response message that carries the obtained location trigger information and sending the response message to the location UE.

9 Claims, 4 Drawing Sheets

METHOD AND DEVICE FOR SYNCHRONIZING LOCATION TRIGGER INFORMATION

This application is a continuation of international application No. PCT/CN2007/070913, filed on Oct. 17, 2007, which claims a priority from the Chinese Patent Application No. 200710072887.5, filed with the Chinese Patent Office on Jan. 18, 2007 and entitled "Method and Device for Synchronizing Location Trigger Information", the contents of which are incorporated herein by reference in their entirety.

TECHNICAL FIELD

The disclosure relates to a mobile communication technology, and in particular, to a method for synchronizing location trigger information in a location technology, a location device, and a Secure User-Plane Location (SUPL)-Enabled Terminal (SET).

BACKGROUND

The Location Service (LCS) in a mobile communication network obtains the location information of a target User Equipment (UE) through a specific location technology. The location information may be longitude and latitude information, or the location of a local street. The location information may be sent to the target UE for locating the user, or sent to the communication system for area-based charging, or sent to an operator for operation and maintenance, or sent to other organizations or individuals who request to obtain the location of the user for the purpose of value-added services. The LCS is primarily applied to: emergency rescue, vehicle navigation, intelligent traffic system, work scheduling, team management, mobile yellow page query, and network performance enhancement.

The Open Mobile Alliance (OMA) has formulated many application-layer protocols with respect to LCS. The Secure User-Plane Location (SUPL) protocol is a location protocol specific to a SUPL Enabled Terminal (SET).

The process in the SUPL is categorized into Network Initiated (NI) process and SET Initiated (SI) process, depending on the initiator, where the NI process enables the network to locate the SET, and the SI process enables the SET to locate itself.

The User-plane Location Protocol (ULP) of the OMA defines a SUPL Location Platform (SLP). The SLP includes a SUPL Location Center (SLC) and a SUPL Positioning Center (SPC). The SLC is responsible for handling SUPL operations in the network on the user-plane bearer, and communications between SETs. The SPC is responsible for providing auxiliary data and handling location messages and processes.

For both the NI SUPL process and the SI SUPL process, the SLP server and the SET store all the current location trigger information. If the location trigger information on the SET is not synchronous with that on the SLP for certain reasons (for example, the user identity bound to the SET is changed, possibly because the user uses a different Subscriber Identity Module (SIM) or changes the SET, or the location trigger information on the SET is lost), the subsequent location process does not go on normally.

As an organization for formulating radio specifications of GSM networks and WCDMA networks, the 3rd Generation Partnership Project (3GPP) has formulated numerous protocols about the location service. Such protocols define the capabilities of the network in locating a SET, including: instant location, deferred location, and periodical location.

For deferred location, the location result is not necessarily returned to the location requester immediately; instead, the location process is triggered through an event (namely, time, or a specific radio network event) to obtain the location result finally. The triggering of the location process through an event is sometimes detected by the radio network, and is sometimes detected through the SET. Generally, several processes such as event delivery, event occurrence, and location trigger request are involved. The deferred location usually requires the SET to store some event information for triggering location, and relevant auxiliary information such as area information in the area triggering and time information in the periodical triggering.

Likewise, the location trigger information such as the area change event and the area information is stored in the SET. The SET relies on such information to judge whether the location needs to be reported. Once the SET loses such trigger information for certain reasons, the information on the SET is out of sync with the trigger information stored on the network-side device, which makes it impossible to report the deferred location of area change subsequently. Moreover, the request for deferred location of area change is specific to a particular user rather than SET hardware. Once the identity of the SET user is changed (for example, the user changes the SIM card or SET), the existing location of the user may not be handled normally.

SUMMARY

Embodiments of the present disclosure provide a method for synchronizing location trigger information, a location device, and a SET to keep synchronization of location trigger information between the SET and the network-side location device.

A method for synchronizing location trigger information in some embodiments of the disclosure may include:

receiving a request for synchronizing location trigger information from a UE, where the request carries user identifier information of the user;

obtaining the location trigger information corresponding to the user identifier information of the user from correspondingly stored user identifier information and location trigger information; and generating a response message that carries the obtained location trigger information, and sending the response message to the user.

A location device provided in some embodiments of the disclosure may include:

a first storing unit, configured to store user identifier information and location trigger information of a location user, where the user identifier information corresponds to the location trigger information;

a first communicating unit, configured to receive a request for synchronizing location trigger information from the location user, where the request carries the user identifier information of the location user; and a first synchronizing unit, configured to: respond to the request for synchronizing location trigger information received by the first communicating unit, obtain the location trigger information corresponding to the user identifier information of the location user from the first storing unit, generate a response message that carries the obtained location trigger information, and send the response message to the location user through the first communicating unit.

A SET provided in an embodiment of the disclosure includes a second communicating unit, and further includes:

a second synchronizing unit, configured to: generate a request for synchronizing location trigger information, send the request for synchronizing location trigger information through the second communicating unit, and receive the returned location trigger information through the second communicating unit; and a second storing unit, configured to store the location trigger information received by the second synchronizing unit.

In the technical solution of the disclosure, the network-side location device stores correspondingly the user identifier information and location trigger information of each location user. The SET may send a request for synchronizing location trigger information to the network-side location device actively at intervals, thus synchronizing the location trigger information between the SET and the network-side location device. Therefore, when the user changes the SET, the location trigger information of the user is synchronized to a new SET; or, after the SET loses the location trigger information, the location trigger information is obtained from the network-side location device again. In this way, for the user, the location trigger information stored on the SET of the user is consistent with the location trigger information stored on the network-side location device, thus ensuring normal progress of the subsequent triggered location process, improving the success ratio of location, and avoiding information loss in the case of SET failure and impact on the whole location process in the case of user identity change.

DETAILED DESCRIPTION

Embodiments of the disclosure provide the following technical conception to overcome the out-of-sync of location trigger information between the SET and the network-side location device caused by loss of location trigger information or change of the user's SIM card in the conventional art.

The network-side location device stores user identifier information and the location trigger information of each location user. When the synchronization trigger conditions are met, the SET sends a request for synchronizing location trigger information to the network-side location device actively, where the request carries the user identifier information of the user currently bound to the SET. After receiving the request for synchronizing location trigger information of the location user, the network-side location device obtains the location trigger information corresponding to the user identifier information from the stored user identifier information and location trigger information, and then generates a response message that carries the location trigger information of the user and sends the response message to the location user.

The synchronization trigger conditions may be set flexibly as required, as exemplified below:

the terminal equipment of the location user, also known as location UE or SET, may send a request for synchronizing location trigger information periodically to update the locally stored location trigger information periodically;

the terminal equipment of the location user (location UE) may send a request for synchronizing location trigger information upon detecting loss of the locally stored location trigger information, and obtain again and store the location trigger information; and the terminal equipment of the location user (location UE) may send a request for synchronizing location trigger information upon updating the bound user identifier information, thus synchronizing the location trigger of the newly bound user to the SET or UE currently used by the user, with all previous location trigger information of the user deleted at the same time. In this way, the terminal equipment (or location UE) may prompt the user before sending the request for synchronizing location trigger information, and send the request for synchronizing location trigger information after the user confirms.

Nevertheless, the disclosure is not limited to the foregoing trigger conditions.

The request for synchronizing location trigger information sent by the SET may further carry the SET capability information. According to the SET capability information, the network-side location device may adjust the location trigger information, and return the adjusted location trigger information to the location user.

The technical solution of the disclosure is hereinafter described in detail with reference to embodiments and accompanying drawings.

Figure 1:
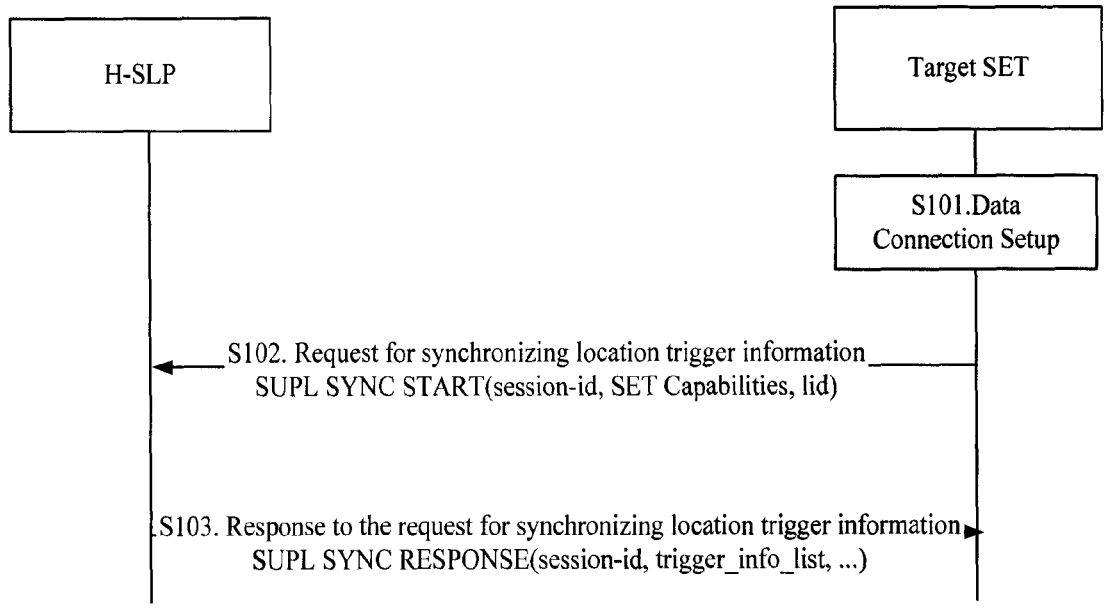
FIG. 1 is an exemplary flowchart of a method for synchronizing location trigger information in proxy mode according to an embodiment of the disclosure.

As shown in FIG. 1, this embodiment may be a proxy mode defined by the OMA, and the target SET to be located is a SUPL-enabled target SET, the network-side location device is an SLP, and the H-SLP is the home SLP of the target SET. The method for synchronizing location trigger information consistent with this embodiment may include the following steps:

Step S101: The SET is attached to the packet data network, or the SET sets up a circuit switched data connection (Data Connection Setup).

When the trigger conditions of the synchronization process are met, for example, such as when the target SET detects that the user identifier information bound to the SIM card is changed after the user inserts a SIM card, the target SET prompts the user whether to synchronize the SUPL trigger information again. After the user confirms, the SET is ready to send a request for synchronizing location trigger information specific to this user. At this time, if the SET is not attached to the packet data network, or if the SET creates no circuit switched data connection, step S101 needs to be performed; if the SET is attached to the packet data network, or if the SET has created a circuit switched data connection, the SET may use the created connection directly without performing step S101.

Step S102: The SET sends a request for synchronizing location trigger information (for example, a SUPL SYNC START message) to the H-SLP, where the message carries at least a session ID (sessionid) and may further carry the SET capability information (SET Capabilities).

First, the SET uses the default address provided by the home network to create a secure IP connection with the H-SLP, and uses the secure IP connection to send a request for synchronizing location trigger information to the H-SLP.

The session ID of the message includes the user identifier information of the SET—"SETID". The SETID may carry the International Mobile Subscriber Identity (IMSI)/Mobile Station International ISDN Number (MSISDN) of the changed SIM card. The SET capabilities include the location method supported by the SET, for example, SET-Assisted A-GPS (where GPS is an acronym of Global Positioning System) and SET-Based A-GPS; and the relevant location protocols supported by the SET, for example, Radio Resource LCS Protocol (RRLP), Radio Resource Control (RRC), or Telecommunications Industry Association (TIA)-801.

Step 103: The H-SLP sends a message to the SET in response to the request for synchronizing location trigger information, where the response message carries the location trigger information corresponding to the user identifier information. An example of the response message is SUPL SYNC RESPONSE.

According to the user identifier information and location trigger information which are pre-stored correspondingly, the H-SLP searches out all trigger information currently corresponding to the IMSI/MSISDN, and generates a trigger information list (trigger_info_list). The list includes the trigger parameters used by the location trigger information. The trigger parameters of the location trigger information include at least the corresponding session ID (sessionid), location method (posmethod), and trigger information (trigger_param). In the case of periodical location trigger information, the trigger parameters may include the periodical (rep_mode) parameter.

If the request for synchronizing location trigger information carries the SET capability information, the H-SLP may determine the location method and/or relevant protocols to be used in the location trigger information of the SETID again according to the SET capability information, and update the posmethod of the location trigger information in the trigger information list (trigger_info_list). Therefore, the location method that matches the SET capability can be used in the subsequent triggered location process, thus improving the location success ratio of the subsequent triggered location process.

The H-SLP/H-SLC may send a trigger_info_list to the SET through a SUPL SYNC RESPONSE message that carries a "sessionid".

After receiving the SUPL SYNC RESPONSE message, the SET may release the secure IP link with the H-SLP. The secure IP link may protect the security of connection and communication between the SET and SLP/SLC. The link is created before a SUPL session begins between the SET and the SLP/SLC, and disconnected after completion of the session.

The process of synchronizing the trigger information after the user changes the SIM card is complete. In this way, for the SET user, the location trigger information stored on the SET of the user is consistent with the location trigger information stored on the network-side location device, thus ensuring normal progress of the subsequent triggered location process, improving the success ratio of location, and avoiding impact on the location process in the case of user identity change.

Figure 2:
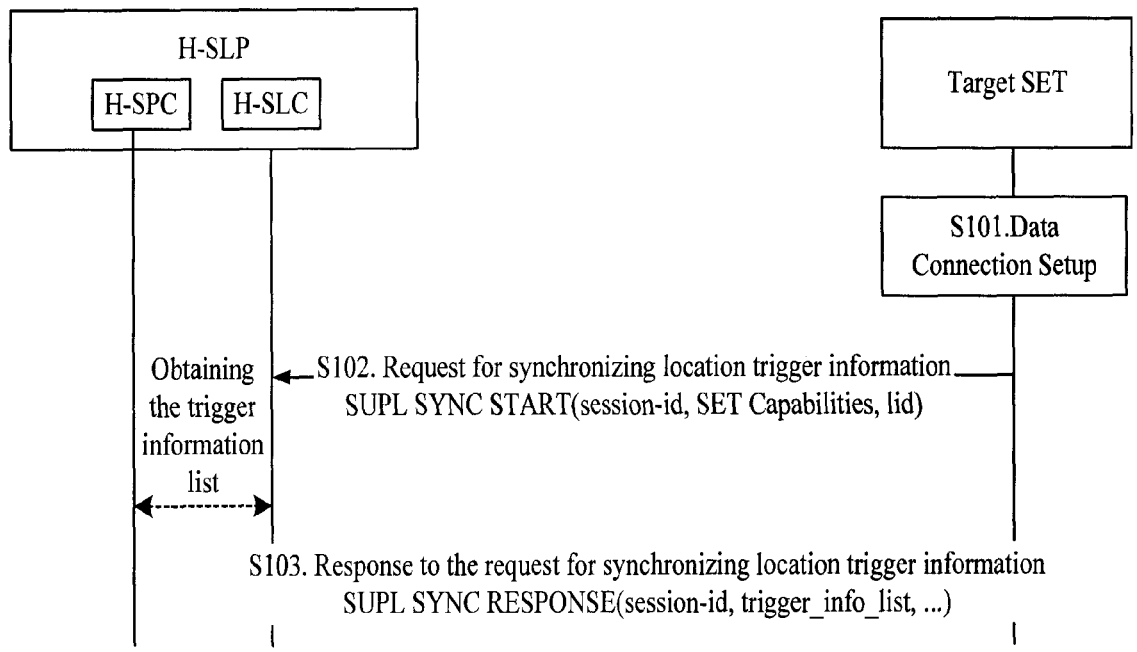
FIG. 2 is an exemplary flowchart of a method for synchronizing location trigger information in non-proxy mode according to an embodiment of the disclosure.

As shown in FIG. 2, this embodiment adopts a non-proxy mode defined by the OMA. The SLP includes two parts: SLC and SPC, which are set separately. The user identifier information and the corresponding trigger information list may be stored on the SLC or the SPC. Through the message interaction with the SLC, the SET implements synchronization of trigger information. If all the user identifier information and the corresponding trigger information list are stored on the SLC, the SLC obtains the trigger information list of the user locally. If all the user identifier information and the corresponding trigger information list are stored on the SPC, the SLC obtains the trigger information list of the user from the SPC. Other specific processes may be similar to those of the proxy mode, and are not repeated further.

The foregoing embodiment supposes that the user changes the SIM card. If other trigger conditions of the synchronization process are met, the synchronization process may be similar and is therefore not repeated further.

The process is further described below, supposing the deferred location trigger information defined by the 3GPP is synchronized.

Figure 3:
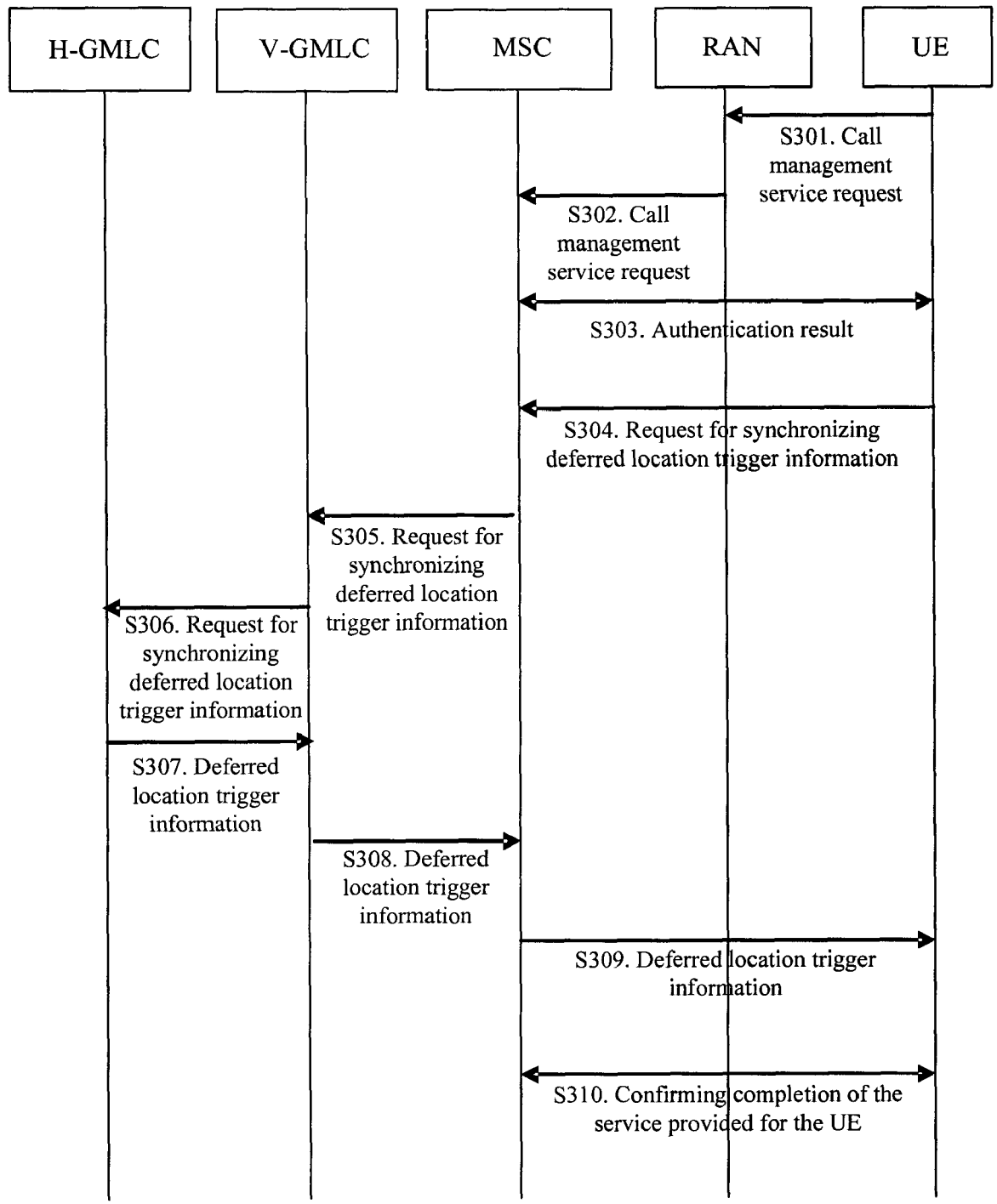
FIG. 3 is an exemplary flowchart of a method for synchronizing location trigger information in the CS domain according to an embodiment of the disclosure.

FIG. 3 shows the process of implementing synchronization in the Circuit Switched (CS) domain, where: the UE is the SET currently used by the user; the Gateway Mobile Location Center (GMLC) is a location device; the Home-Gateway Mobile Location Center (H-GMLC) is a home GMLC of the UE; and the Visitor-Gateway Mobile Location Center (V-GMLC) is a GMLC of the roaming area of the UE. The process may include the following steps:

Step S301: Through the Radio Access Network (RAN), the UE requests an LCS from the Mobile Switching Center (MSC) or the MSC server, for example, by sending a Call Management (CM) Service Request.

When the trigger conditions for synchronizing location trigger information are met, the UE sends a request for synchronizing deferred location trigger information actively. First, the UE needs to request the LCS from the MSC/MSC server through the RAN.

Step S302: The RAN transmits the CM Service Request to the MSC/MSC server in the core network transparently.

Step S303: The MSC/MSC server interacts with the UE to obtain the LCS attributes of the UE, authenticates the user according to the LCS attributes of the UE, and returns the authentication result to the UE.

Step S304: After the authentication succeeds, the UE sends a request for synchronizing deferred location trigger information to the MSC/MSC server through the RAN. The request carries the unique identifier of the UE user.

The request may be extended from the service request in the conventional art. For example, an indication value may be set in the Location Services Invoke in the conventional art to indicate that the service request intends to request retransmission of the deferred location trigger information.

Step S305: The MSC/MSC server forwards the request for synchronizing deferred location trigger information to the corresponding V-GMLC.

The MSC/MSC server may carry the request for synchronizing deferred location trigger information in the Mobile Application Part (MAP) Subscriber Location Report message, and send the message to the V-GMLC.

Step S306: The V-GMLC further forwards the request for synchronizing deferred location trigger information to the H-GMLC.

The Mobile Originated Location Request (MO-LR) Triggered Information message for carrying the request for synchronizing deferred location trigger information may be defined.

Step S307: The H-GMLC queries the location trigger information corresponding to the user identifier information, generates a response message that carries the location trigger information, and sends the response message to the V-GMLC.

The MO-LR Triggered Information Ack may be defined as a response message.

Among the locally stored user identifier information and the corresponding location trigger information, the H-GMLC searches out all the current deferred location trigger information of the user, and generates a deferred location trigger information list of the user, where the list includes the necessary information of deferred location trigger information.

Step S308: The V-GMLC returns the deferred location trigger information list to the MSC/MSC server. The deferred location trigger information list may be carried in a Subscriber Location Report Ack message for sending.

Step S309: Through the RAN, the MSC/MSC server forwards the deferred location trigger information list to the UE, and the list may be carried in a Circuit Switched Mobile Originated Location Request (CS-MO-LR) Return Result for sending.

The SET resolves the deferred location trigger information in the received deferred location trigger information list, stores the deferred location trigger information to the SET, activates such deferred location processes, and proceeds with the subsequent deferred location process.

Step S310: While sending the deferred location trigger information list to the UE, the MSC/MSC server may confirm completion of the service provided for the UE, and the MSC/MSC server releases the connection with the UE.

By now, all the deferred location trigger information of the user stored on the H-GMLC is synchronized to the UE used by the user.

If the UE is not roaming, in the process shown in FIG. 3, message interaction is performed between the MSC/MSC server and the H-GMLC directly, without being forwarded by the V-GMLC.

Figure 4:
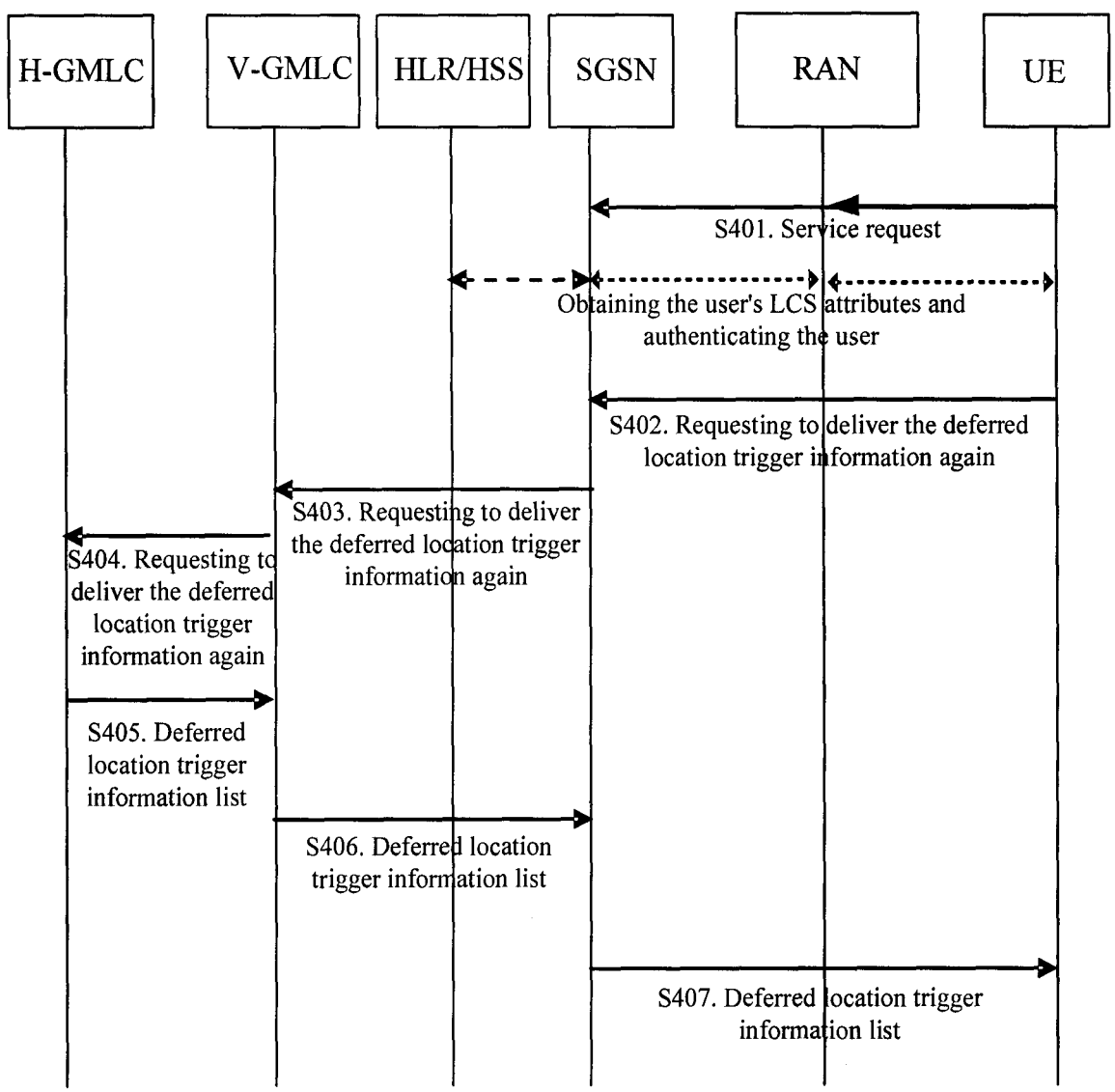
FIG. 4 is an exemplary flowchart of a method for synchronizing location trigger information in the PS domain according to an embodiment of the disclosure.

As shown in FIG. 4, the specific synchronization process is described briefly below, supposing the synchronization is implemented in the Packet Switched (PS) domain:

Step S401: The UE initiates the process of requesting the deferred location trigger information actively again. If the UE is in the idle state, the UE requests a PS signaling connection, and sends a service request to the Serving GPRS Support Node (SGSN) through the RAN.

The SGSN obtains the LCS attributes of the user from the Home Location Register (HLR)/Home Subscriber Server (HSS), and authenticates the user.

Step S402: After the authentication succeeds, the UE sends an LCS PS-MO-LR Location Services invoke message to the SGSN. The service type requested is a new type, namely, requesting the network to deliver the deferred location trigger information again. The message carries the unique identifier of the UE user.

Step S403: The SGSN sends a Subscriber Location Report message to the corresponding V-GMLC, and forwards the received request to the V-GMLC, requesting the V-GMLC to deliver the deferred location trigger information to the UE again.

Step S404: Through the MO-LR Triggered Information message, the V-GMLC forwards the received deferred location trigger information request to the H-GMLC.

Step S405: The H-GMLC searches out all the current deferred location trigger information corresponding to the user identifier information, and generates a deferred location information list of the user. The list includes the necessary information of deferred location trigger information. The H-GMLC may return the deferred location information list to the V-GMLC through an MO-LR Triggered Information Ack message.

Step S406: The V-GMLC returns the deferred location trigger information list to the SGSN through a Subscriber Location Report Ack message.

Step S407: The SGSN returns a "CS-MO-LR Return Result" to the UE, transfers the deferred location trigger information list, and confirms completion of the service provided for the UE.

The UE resolves the deferred location trigger information in the received deferred location trigger information list, stores the information to the UE, activates such deferred location processes, and proceeds with the subsequent deferred location process. The UE releases the relevant connection resources.

Figure 5:
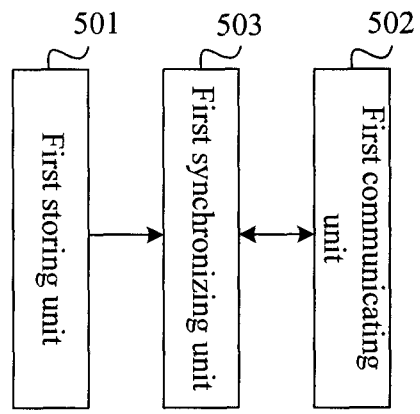
FIG. 5 shows an exemplary structure of a location device provided in an embodiment of the disclosure.

As shown in FIG. 5, a location device provided in an embodiment of the disclosure may include:

a first storing unit 501, configured to store the user identifier information and location trigger information of a location user, where the user identifier information corresponds to the location trigger information;

a first communicating unit 502, configured to receive a request for synchronizing location trigger information from the location user, where the request carries the user identifier information of the location user; and a first synchronizing unit 503, configured to: respond to the request for synchronizing location trigger information received by the first communicating unit 502, obtain the location trigger information corresponding to the user identifier information from the first storing unit 501, and send the obtained location trigger information to the location user through the first communicating unit 502.

In a specific implementation scenario, the location device may be an SLP or a GMLC.

Figure 6:
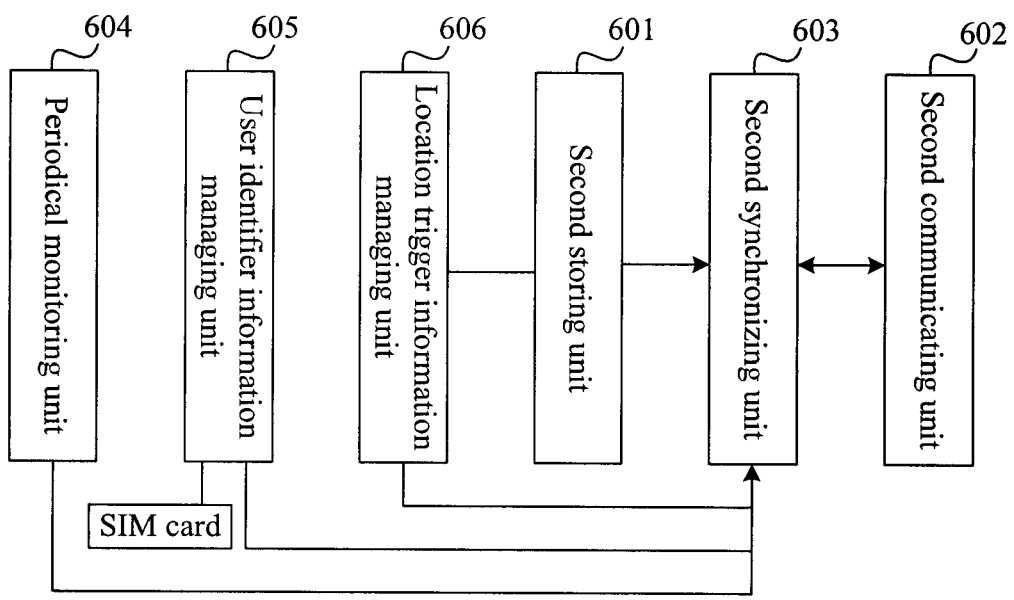
FIG. 6 shows an exemplary structure of a SET provided in an embodiment of the disclosure.

As shown in FIG. 6, a Secure User-Plane Location (SUPL)-Enabled Terminal (SET) provided in an embodiment of the disclosure may include:

a second storing unit 601, configured to store location trigger information on the SET;

a second communication unit 602, configured to implement communication with a location device; and a second synchronizing unit 603, configured to: generate a request for synchronizing location trigger information when the trigger conditions are met, send the request for synchronizing location trigger information through the second communicating unit 602, receive the returned location trigger information through the second communicating unit 602, and store the information to the second storing unit 601.

Further, the SET includes at least one of the following triggering units (FIG. 6 shows only one type of the structure of the SET):

a periodical monitoring unit 604, configured to: send a first trigger signal to the second synchronizing unit 603 periodically at set intervals, and trigger the second synchronizing unit 603 to generate and send a request for synchronizing location trigger information;

a user identifier information managing unit 605, connected to the SIM card of the SET, and configured to: manage the bound user identifier information; once the user changes the SIM card, detect whether the user identifier information on the SIM card is changed; upon detecting change of the bound user identifier information, send a second trigger signal to the second synchronizing unit 603 to trigger the second synchronizing unit 603 to generate and send a request for synchronizing location trigger information; and a location trigger information managing unit 606, configured to: manage the second storing unit 601; upon detecting loss of the location trigger information stored in the second storing unit, send a third trigger signal to the second synchronizing unit 603 to trigger the second synchronizing unit 603 to generate and send a request for synchronizing location trigger information.

In the technical solution of the disclosure, the network-side location device stores correspondingly the user identifier information and location trigger information of each location user. The periodical monitoring unit in the SET may send a request for synchronizing location trigger information to the network-side location device actively at intervals, thus synchronizing the location trigger information between the SET and the network-side location device. When the user changes the SET, the user identifier information managing unit may trigger a synchronization process to synchronize the location trigger information of the user to the new SET. When the SET loses the location trigger information, the location trigger information managing unit may trigger a synchronization process to obtain the location trigger information from the network-side location device again. In this way, for the user, the location trigger information stored on the SET of the user is consistent with the location trigger information stored on the network-side location device, thus ensuring normal progress of the subsequent triggered location process, improving the success ratio of location, and avoiding information loss in the case of SET failure and impact on the whole location process in the case of user identity change.

Further, the request for synchronizing location trigger information sent by the SET may carry the SET capability information. According to the SET capability information, the network-side location device may adjust the location trigger information, and return the adjusted location trigger information to the location user, thus further improving the location success ratio of the subsequent triggered location process.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the following claims or their equivalents.

What is claimed is:

1. A method for synchronizing location trigger information, comprising:
   receiving, by a Home-Gateway Mobile Location Center (H-GMLC) on a network side, a request for synchronizing deferred location trigger information from a location User Equipment (UE), wherein the request carries user identifier information of a location user, and the deferred location trigger information comprises area change event and area information;
   obtaining, by the H-GMLC, the deferred location trigger information corresponding to the user identifier information of the location user from correspondingly stored user identifier information and deferred location trigger information; and
   generating, by the H-GMLC, a response message that carries the obtained deferred location trigger information, and sending the response message to the location UE.

2. The method of claim 1, wherein:
   the request for synchronizing deferred location trigger information is sent by the location user through a Radio Access Network (RAN) to a Mobile Switching Center (MSC), and forwarded by the MSC to the H-GMLC; and
   the response message is sent by the H-GMLC to the MSC, and forwarded by the MSC through the RAN to the location user.

3. The method of claim 2, wherein the request for synchronizing deferred location trigger information and the response message exchanged between the H-GMLC and the MSC are forwarded by a Visitor-Gateway Mobile Location Center (V-GMLC) of the location user.

4. The method of claim 2, further comprising:
   sending, by the location user, a Location Service (LCS) request to the MSC through the RAN;
   obtaining, by the MSC, LCS attributes from the location user, authenticating the location user according to the LCS attributes, and returning an authentication result to the location user through the RAN; and
   sending, by the location user, the request for synchronizing deferred location trigger information after confirming success of the authentication.

5. The method of claim 1, wherein:
   the request for synchronizing deferred location trigger information is sent by the location user through a Radio Access Network (RAN) to a Serving General Packet Radio Service (GPRS) Support Node (SGSN), and forwarded by the SGSN to the H-GMLC; and
   the response message is sent by the H-GMLC to the SGSN, and forwarded by the SGSN through the RAN to the location user.

6. The method of claim 5, wherein the request for synchronizing deferred location trigger information and the response message exchanged between the H-GMLC and the SGSN are forwarded by a Visitor-Gateway Mobile Location Center (V-GMLC) of the location user.

7. The method of claim 5, further comprising:
   sending, by the location user, a Location Service (LCS) request to the SGSN through the RAN;
   obtaining, by the SGSN, LCS attributes of the location user from a Home Location Register (HLR)/Home Subscriber Server (HSS), authenticating the location user according to the LCS attributes, and returning an authentication result to the location user through the RAN; and
   sending, by the location user, the request for synchronizing deferred location trigger information after confirming success of the authentication.

8. A location device, comprising:
   a first storing unit, configured to store user identifier information and deferred location trigger information of a location user, wherein the user identifier information corresponds to the deferred location trigger information, and the deferred location trigger information comprises area change event and area information;
   a first communicating unit, configured to receive a request for synchronizing deferred location trigger information from the location user, wherein the request carries the user identifier information of the location user; and
   a first synchronizing unit, configured to: respond to the request for synchronizing deferred location trigger information received by the first communicating unit, obtain the deferred location trigger information corresponding to the user identifier information of the location user from the first storing unit, generate a response message that carries the obtained deferred location trigger information, and send the response message to the location user through the first communicating unit; wherein the location device is a Secure User Plane Location (SUPL) Location Platform (SLP) or a Gateway Mobile Location Center (GMLC).

9. A Secure User-Plane Location (SUPL)-Enabled Terminal (SET), comprising a first communicating unit and a second communicating unit, and further comprising:
   a first synchronizing unit and a second synchronizing unit, the second synchronizing unit configured to: generate a request for synchronizing deferred location trigger information, send the request for synchronizing deferred location trigger information through the second communicating unit, and receive the returned deferred location trigger information through the second communicating unit; and a first storing unit and a second storing unit, the second storing unit configured to store the deferred location trigger information received by the second synchronizing unit; wherein the SET comprises at least one of:

a periodical monitoring unit, configured to: send a first trigger signal to the second synchronizing unit periodically, and trigger the second synchronizing unit to generate and send the request for synchronizing deferred location trigger information;

a user identifier information managing unit, configured to: manage the bound user identifier information; and, upon detecting change of the bound user identifier information,: send a second trigger signal to the second synchronizing unit to trigger the second synchronizing unit to generate and send the request for synchronizing deferred location trigger information; and a location trigger information managing unit, configured to: manage the second storing unit; and, upon detecting loss of the deferred location trigger information stored in the second storing unit,: send a third trigger signal to the second synchronizing unit to trigger the second synchronizing unit to generate and send the request for synchronizing deferred location trigger information.

* * * * *

UNITED STATES PATENT AND TRADEMARK OFFICE
CERTIFICATE OF CORRECTION

PATENT NO.        : 8,326,325 B2  
APPLICATION NO.   : 12/420953  
DATED             : December 4, 2012  
INVENTOR(S)       : Zhengkai Ge Page 1 of 1

It is certified that error appears in the above-identified patent and that said Letters Patent is hereby corrected as shown below:

Column 12:  
Line 4, delete "tion,: send" and insert --tion, send--.  
Line 10, delete "unit,: send" and insert --unit, send--.

Signed and Sealed this  
Twenty-sixth Day of February, 2013

Teresa Stanek Rea  
*Acting Director of the United States Patent and Trademark Office*